(12) United States Patent
Mathew et al.

(10) Patent No.: US 11,509,695 B1
(45) Date of Patent: *Nov. 22, 2022

(54) MANAGEMENT OF CONTROLLED-ENVIRONMENT FACILITY RESIDENT IMAGE AND/OR BACKGROUND DURING VIDEO VISITATION

(71) Applicant: Securus Technologies, LLC, Carrollton, TX (US)

(72) Inventors: Ligit Mathew, Flower Mound, TX (US); Daniel Wright, Little Elm, TX (US); Nikita Dehoumon, Montreal (CA)

(73) Assignee: Securus Technologies, LLC, Carrollton, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/158,426

(22) Filed: Jan. 26, 2021

Related U.S. Application Data

(63) Continuation of application No. 15/581,933, filed on Apr. 28, 2017, now Pat. No. 10,904,296.

(51) Int. Cl.
| | |
|---|---|
| *H04L 9/40* | (2022.01) |
| *H04L 65/1076* | (2022.01) |
| *H04L 65/1069* | (2022.01) |
| *H04N 7/14* | (2006.01) |
| *G06Q 50/26* | (2012.01) |

(Continued)

(52) U.S. Cl.
CPC .......... *H04L 63/302* (2013.01); *G06Q 50/26* (2013.01); *H04L 65/1069* (2013.01); *H04L 65/1076* (2013.01); *H04L 65/1089* (2013.01); *H04L 65/765* (2022.05); *H04N 7/142* (2013.01); *H04N 7/147* (2013.01); *H04L 51/212* (2022.05);

(Continued)

(58) Field of Classification Search
CPC .......... H04N 7/15; H04N 7/147; H04N 7/148; H04N 21/4825; H04N 21/472; H04L 63/1408; H04L 65/403
See application file for complete search history.

(56) References Cited

U.S. PATENT DOCUMENTS

| 8,453,241 B2 * | 5/2013 | Davids ................ H04L 63/1408 726/13 |
| 9,077,694 B2 * | 7/2015 | Larson ................ H04L 61/5092 |

(Continued)

*Primary Examiner* — Barbara B Anyan
(74) *Attorney, Agent, or Firm* — Fogarty LLP

(57) ABSTRACT

Information associated with a controlled-environment facility resident communications and/or data device, such as device location within the controlled-environment facility, may be used to determine whether the resident device is approved for two-way video visitation or restricted to on-way video visitation. Video visitation may be initiated and voice and video captured and streamed by a non-resident communications and/or data device, as well as voice and/or video captured and streamed by the resident device, is received by a controlled-environment facility electronic communications management system. Voice and video captured at the non-resident device is transmitted to the resident device and, if the resident device is permitted two-way video visitation, voice and video captured by the resident device is transmitted to the non-resident device, if the resident device is restricted to one-way video visitation, only voice is transmitted to the non-resident device.

20 Claims, 6 Drawing Sheets

(51) Int. Cl.
   *H04L 65/1089*   (2022.01)
   *H04L 65/75*   (2022.01)
   *H04N 7/15*   (2006.01)
   *H04L 51/212*   (2022.01)
   *H04L 51/48*   (2022.01)
   *H04L 61/5092*   (2022.01)
(52) U.S. Cl.
   CPC .......... *H04L 51/48* (2022.05); *H04L 61/5092* (2022.05); *H04N 7/148* (2013.01); *H04N 7/15* (2013.01)

(56)   References Cited

U.S. PATENT DOCUMENTS

| | | | | |
|---|---|---|---|---|
| 9,264,667 | B1* | 2/2016 | Mande | H04N 7/15 |
| 9,749,583 | B1* | 8/2017 | Fineberg | H04N 7/142 |
| 2004/0240642 | A1* | 12/2004 | Crandell | H04M 15/745 |
| | | | | 379/88.22 |
| 2006/0087987 | A1* | 4/2006 | Witt | H04N 19/40 |
| | | | | 348/E7.071 |
| 2006/0215753 | A1* | 9/2006 | Lee | H04N 7/147 |
| | | | | 375/E7.182 |
| 2007/0115948 | A1* | 5/2007 | Dasgupta | H04N 7/148 |
| | | | | 370/356 |
| 2007/0258418 | A1* | 11/2007 | Wurtenberger | H04L 29/06027 |
| | | | | 370/338 |
| 2007/0291108 | A1* | 12/2007 | Huber | H04Q 11/00 |
| | | | | 348/E7.083 |
| 2008/0068447 | A1* | 3/2008 | Matti | H04N 7/15 |
| | | | | 348/E7.083 |
| 2008/0129816 | A1* | 6/2008 | Mattila | H04N 7/147 |
| | | | | 348/E7.083 |
| 2008/0163293 | A1* | 7/2008 | Krummheller | H04N 21/472 |
| | | | | 348/E7.071 |
| 2010/0159976 | A1* | 6/2010 | Marocchi | H04W 8/186 |
| | | | | 455/519 |
| 2011/0021172 | A1* | 1/2011 | Ricordi | G16H 40/67 |
| | | | | 455/404.1 |
| 2011/0202367 | A1* | 8/2011 | Frangioni | G16H 70/20 |
| | | | | 715/764 |
| 2014/0171152 | A1* | 6/2014 | Dempsey | H04M 1/72418 |
| | | | | 455/564 |
| 2014/0258421 | A1* | 9/2014 | Langhorst | H04L 51/48 |
| | | | | 709/206 |
| 2016/0366459 | A1* | 12/2016 | Kochman | H04N 21/4825 |
| 2018/0160074 | A1* | 6/2018 | Mercredi | H04L 65/1083 |
| 2018/0176270 | A1* | 6/2018 | Griffin | H04L 65/1069 |
| 2018/0287976 | A1* | 10/2018 | Hochstein | H04W 4/18 |

* cited by examiner

MANAGEMENT OF CONTROLLED-ENVIRONMENT FACILITY RESIDENT IMAGE AND/OR BACKGROUND DURING VIDEO VISITATION

CROSS-REFERENCE TO RELATED APPLICATION

This is a continuation of, and claims benefit of, U.S. patent application Ser. No. 15/581,933, also entitled Management of Controlled-Environment Facility Resident Image and/or Background During Video Visitation, filed Apr. 28, 2017 and issued as U.S. Pat. No. 10,904,296 on Jan. 26, 2021, which is hereby incorporated herein by reference.

TECHNICAL FIELD

This specification is related to communications by residents of controlled-environment facilities, more specifically to video communications with residents of controlled-environment facilities, and particularly to management of a controlled-environment facility resident's image and/or video background during video visitation.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

SUMMARY

The present invention is directed to systems and methods which provide management of controlled-environment facility resident images and/or backgrounds during video visitation. Therein, a controlled-environment facility resident communications and/or data device may be used by a controlled-environment facility resident to initiate a two-way video visitation request. A controlled-environment facility electronics communications management system, or the like, determines whether this resident device is approved for two-way video visitation or is restricted to one-way video visitation. Whereupon, video visitation session parameters are exchanged and negotiated between the resident device and the non-resident communications and/or data device. The controlled-environment facility electronic communications management system may then determine whether negotiation for a video visitation session were successful.

The controlled-environment facility resident communications and/or data device may stream both voice and video data captured by the resident device, to the electronic communications management system, in response to a determination, by the controlled-environment facility resident electronics communications management system that the resident device is approved for two-way video visitation. Correspondingly, the controlled-environment facility resident communications and/or data device may stream only voice data captured by a microphone of the resident device, to the controlled-environment facility electronic communications management system, in response to a determination, by the electronics communications management system that the resident device is restricted to one-way video visitation.

The non-resident communications and/or data device may correspondingly capture and stream voice and video data to the controlled-environment facility electronic communications management system to enable the video visitation.

The controlled-environment facility electronic communications management system may also record and filter video and/or voice data streamed by the controlled-environment facility resident communications and/or data device and the video and/or voice data streamed from the non-resident communications and/or data device. Additionally, or alternatively, the electronic communications management system may block voice and/or video data streamed by the controlled-environment facility resident communications and/or data device, based on information associated with the resident device. In further alternative or additional implementations, the electronic communications management system may, based on image features detected in the video data streamed from the resident device and/or the non-resident device, block the video data and/or the voice data streamed from the respective communications and/or data device.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
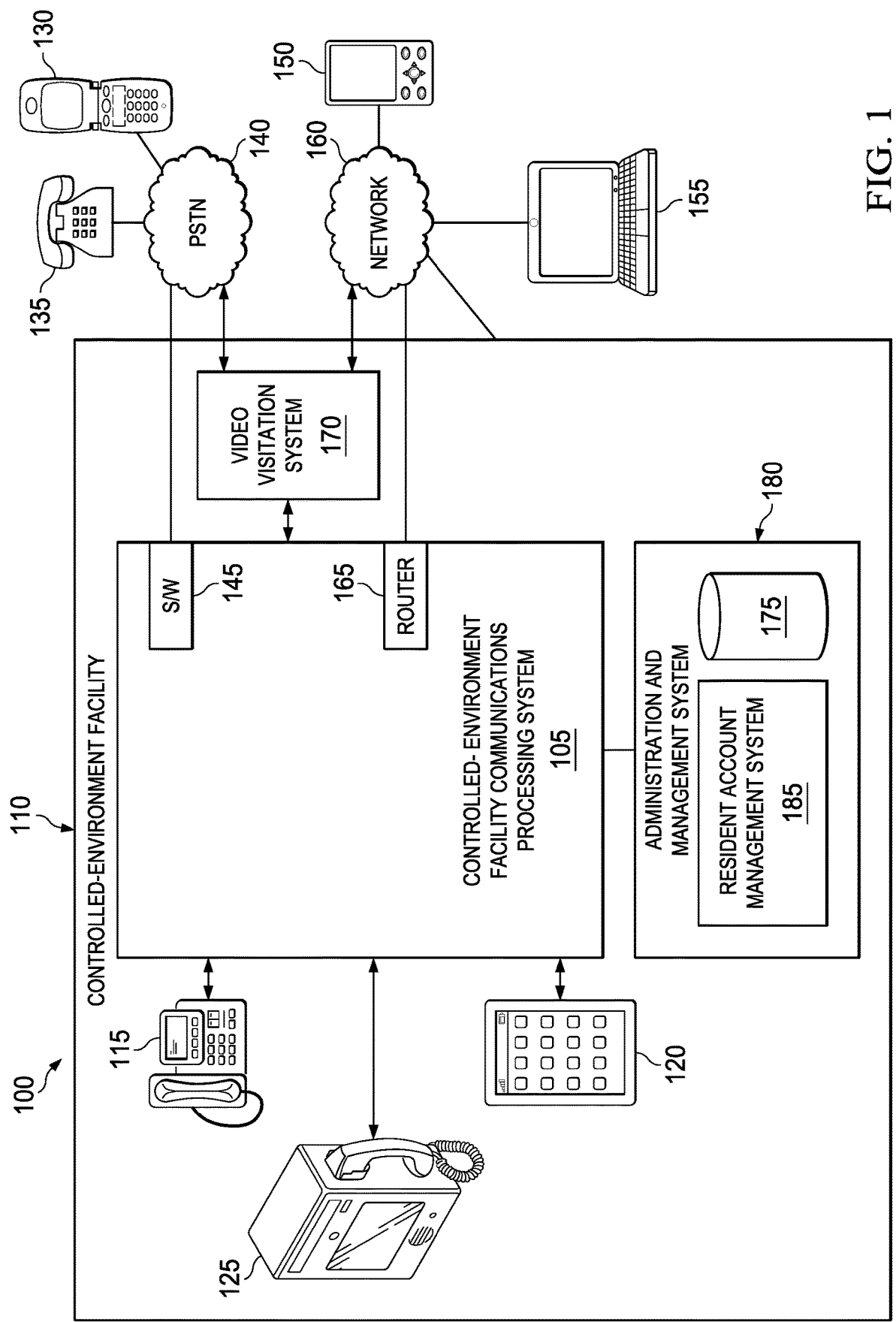
Figure 2:
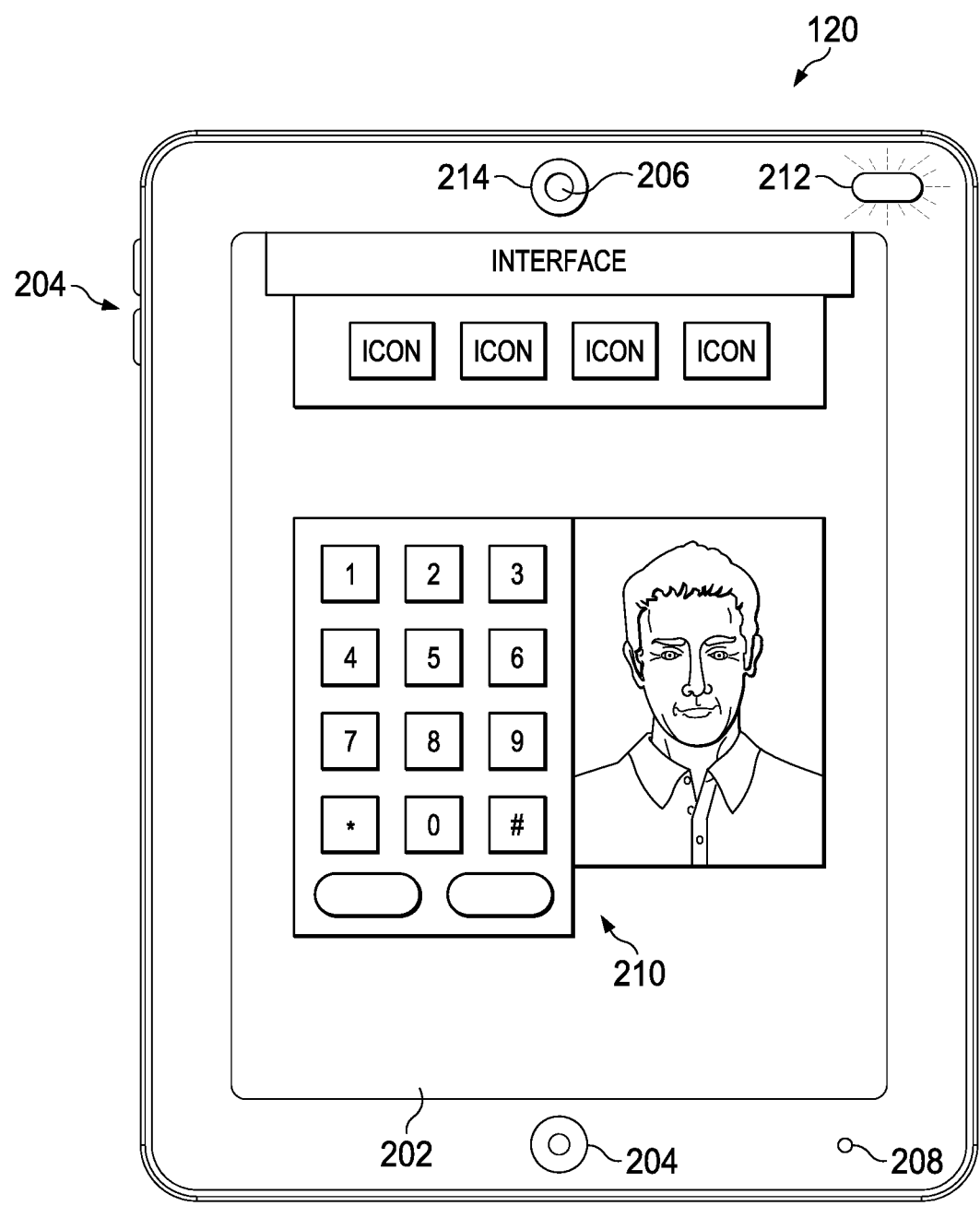
Figure 3:
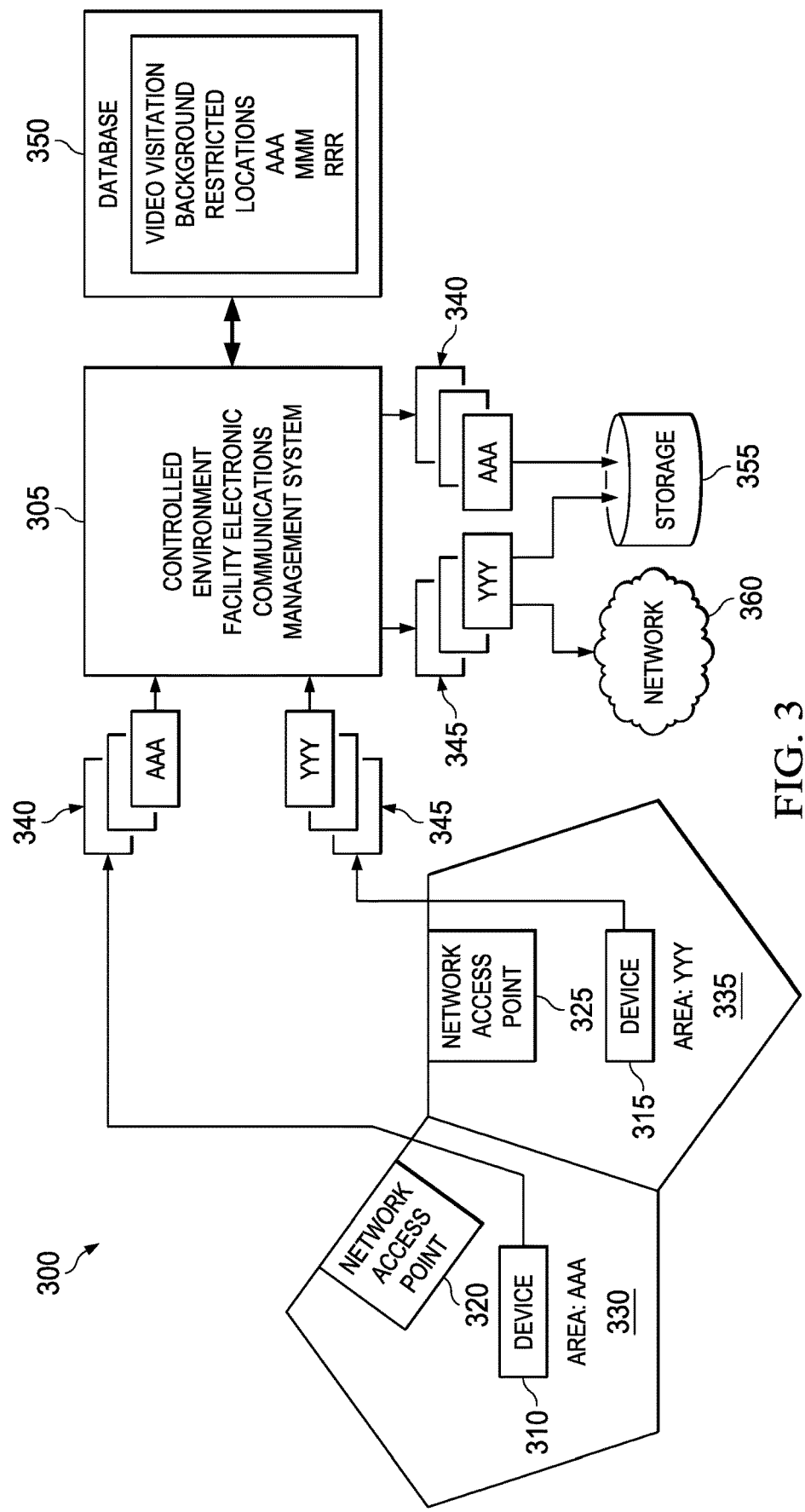
Figure 4:
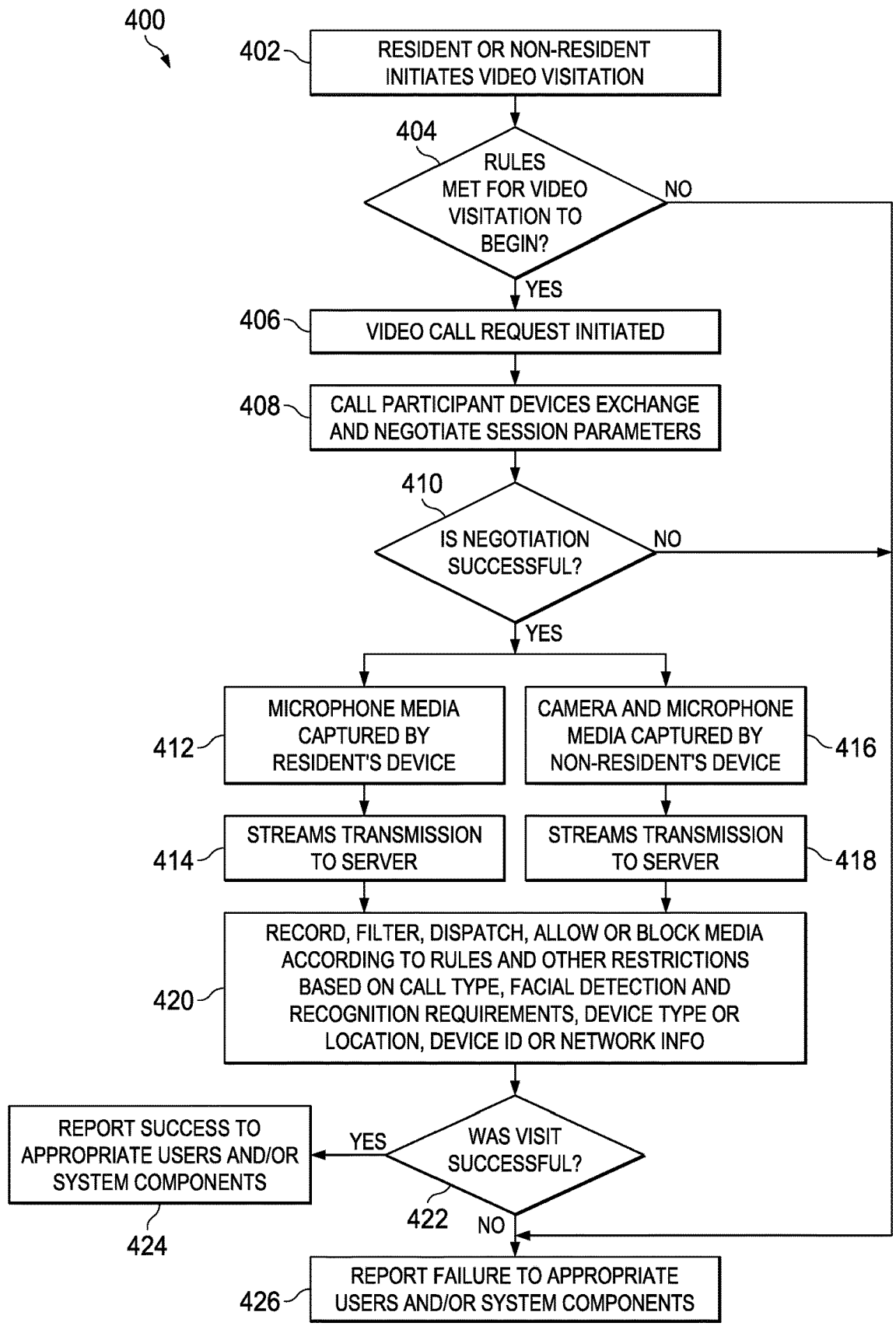
Figure 5:
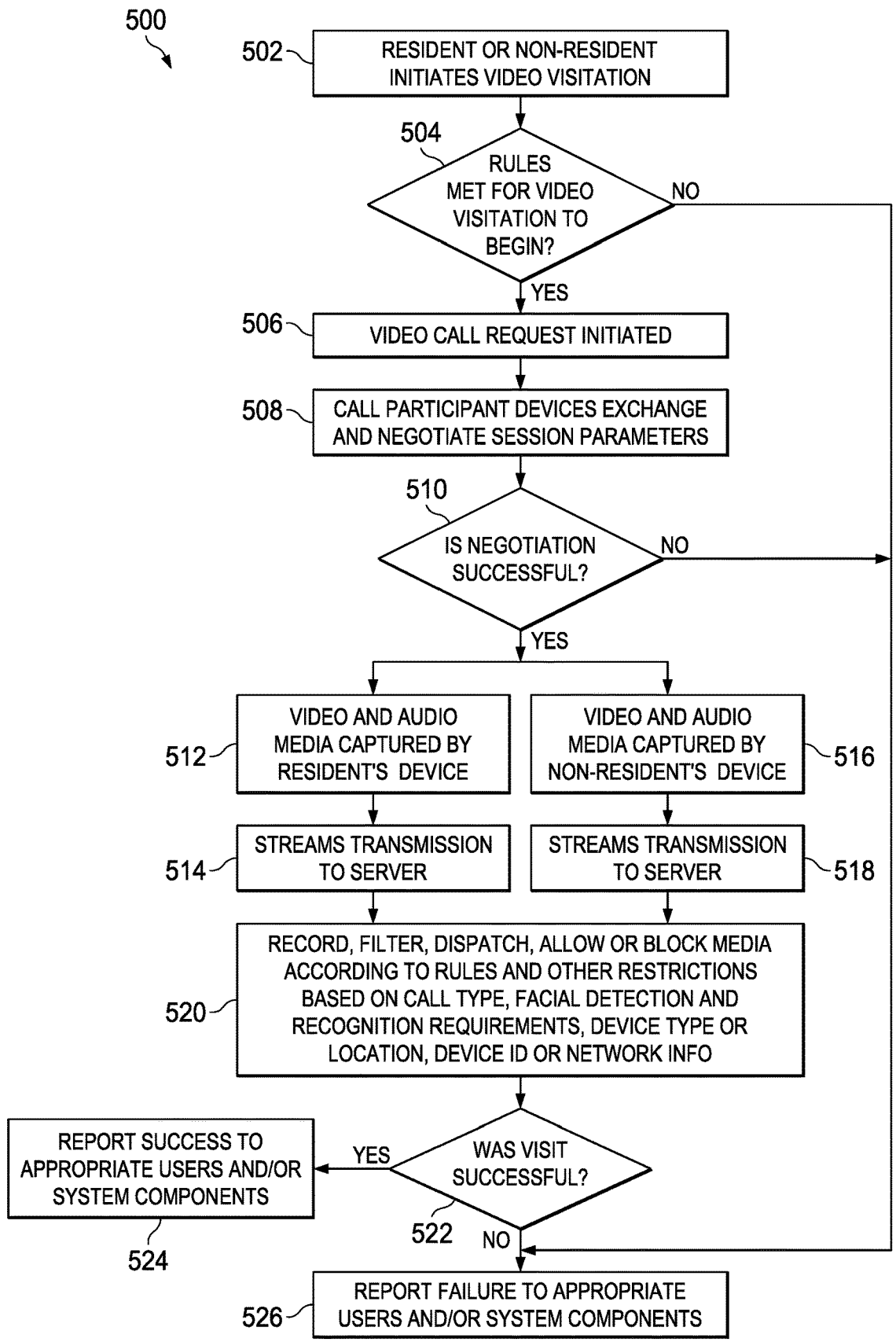
Figure 6:
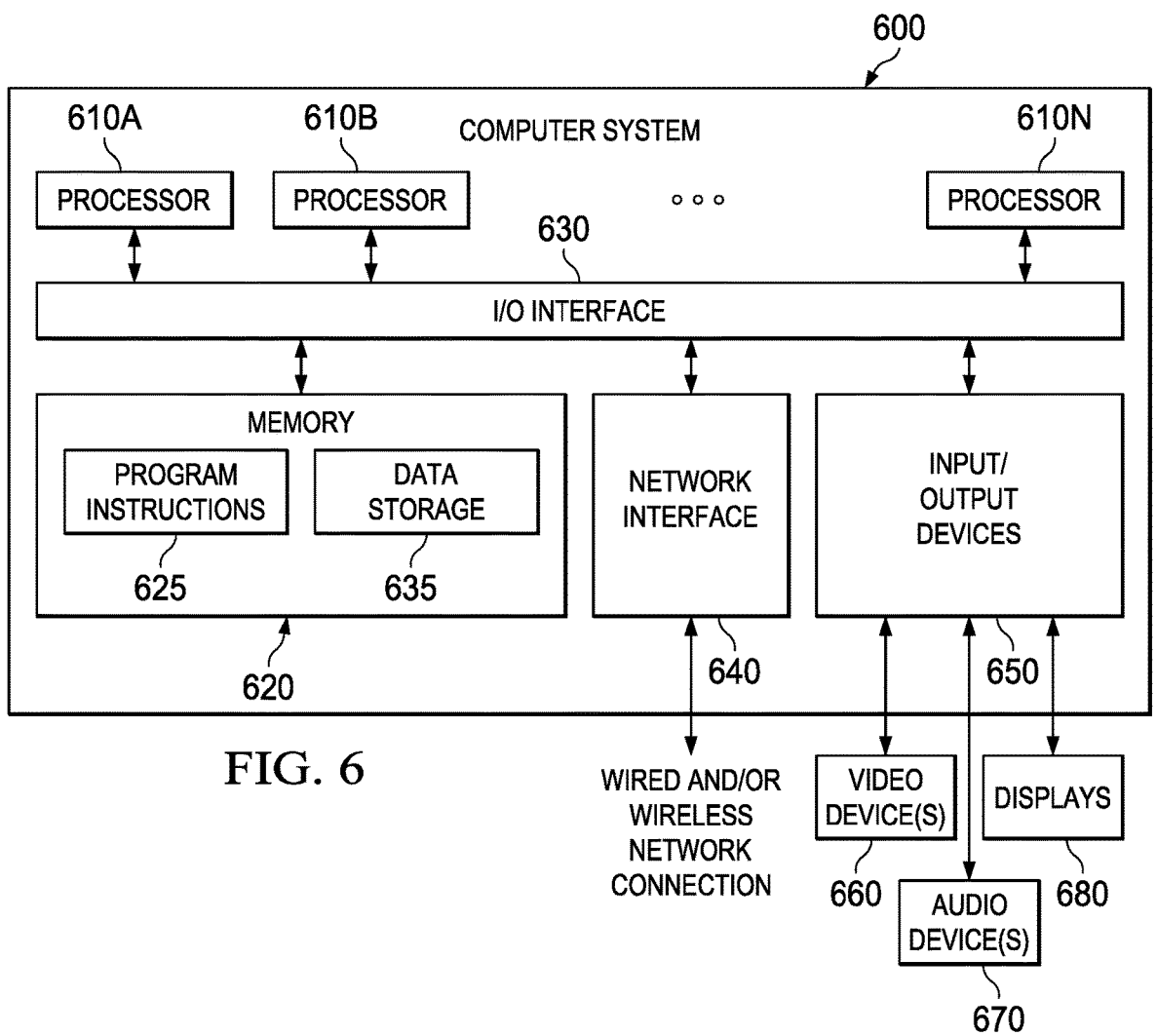

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for management of controlled-environment facility resident image and/or background during video visitation may be deployed, according to some embodiments;

FIG. 2 is a diagrammatic illustration of an example controlled-environment facility resident communications and/or data device, according to some embodiments of the present systems and methods;

FIG. 3 is a diagrammatic block illustration of an example of a location-based one-way video visitation for management of controlled-environment facility resident image and/or background during video visitation, according to some embodiments;

FIG. 4 is a flowchart of an example process for one-way video visitation for management of controlled-environment facility resident image and/or background during video visitation, according to some embodiments;

FIG. 5 is a flowchart of another example process for one-way video visitation for management of controlled-environment facility resident image and/or background during video visitation, according to some embodiments;

FIG. 6 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to communications by residents of controlled-environment facilities, specifically to video communications with residents of controlled-environment facilities, and particularly to management of a controlled-environment facility resident's image and/or video background during video visitation. In accordance with embodiments of the present systems and methods, controlled-environment facility resident identification validation input from a resident operating a controlled-environment facility resident communications and/or data device and information associated with the resident device, such as device location within the controlled-environment facility, may be used to confirm an identity of the resident and to determine whether the resident device is approved for two-way video visitation or a one-way video visitation. If video visitation is initiated, voice and/or video captured and streamed by a non-resident communications and/or data device, as well as voice and/or video captured and streamed by the resident device, is received by controlled-environment facility electronic communications management system. Voice and video captured at the non-resident device is transmitted to the resident device and, if the resident device is permitted two-way video visitation, voice and video captured by the resident device is transmitted to the non-resident device. However, if the resident device is only permitted one-way video visitation, only the voice data captured is transmitted to the non-resident device.

Thereby, embodiments of the present systems and methods enable controlled-environment facility resident to use personal tablet devices, or the like for video visitation inside the controlled-environment facility without compromising security of the controlled-environment facility, while providing more freedom and privacy during the video visitation compared to a video visitation session performed at a terminal device which is fixed at a predetermined location, such as in a day room, or the like of the controlled-environment facility.

FIG. 1 is a diagrammatic illustration of example communications environment 100, wherein an example embodiment of the present systems and methods for management of controlled-environment facility resident image and/or background during video visitation may be deployed, according to some embodiments. As shown, controlled-environment communications processing system 105 may provide telephone services, videoconferencing, online chat, and other communication services to controlled-environment facility 110. In some cases, as illustrated, controlled-environment communications processing system 105 may be co-located with controlled-environment facility 110. Alternatively, controlled-environment facility communications processing system 105 may be centrally or remotely located with respect to one or more controlled-environment facilities and/or may provide communication services to multiple controlled-environment facilities. More generally, however, it should be noted that controlled-environment facility communications processing system 105 may assume a variety of forms, and may be configured to serve a variety of facilities and/or users, whether within or outside of a controlled-environment facility.

Controlled-environment facility residents may use more-or-less conventional telephones 115 to access certain communication services. In some facilities, residents may also use a personal computer wireless device, such as a tablet computing device or smartphone 120, which may have been adapted and/or approved for use in controlled-environment facility. Such a device may be referred to as a controlled-environment facility resident communications and/or data device or Intelligent Resident Device (IRD). In a correctional institution embodiment, such an IRD may be referred to as an Intelligent Inmate Device (IID), or the like. Also in some facilities, a resident may use a video communication device 125, or the like, to place voice calls, as well as for video communication. Such a video communication device may be referred to as an Intelligent Facility Device (IFD), which may be a video phone particularly adapted for use in a controlled-environment facility. Generally speaking, video communication device/IFD 125 may be disposed in a visitation room, in a day room, in a pod, as part of a kiosk, etc. As will be appreciated, IRD 120, IFD 125, or other similar devices have video conferencing capabilities, or the like, to enable a party to participate in video communication sessions with other call parties, such as non-residents of the controlled-environment facility, via video communication, secure online chat, etc.

As noted, controlled-environment facility resident communications and/or data device 120 (IRD 120) may be a tablet computing device, smartphone, or the like, adapted and/or approved for use by residents of the controlled-environment facility (within the controlled-environment facility). Each IRD 120 may be particularly adapted for use in a controlled-environment. For example, in a correctional institution, jail, or the like, such an IRD may be "stripped-down," particularly from the standpoint of what applications programs (apps) are provided or allowed on IRD 120, and/or connectivity afforded IRD 120. For example, such an IRD may be adapted to only connect to a network provided by the controlled-environment facility, and/or in only certain locations, within the controlled-environment facility, such as may be controlled by availability of Wi-Fi access, or the like, only being available in certain areas. That is, by way of example, where access may be compartmentalized, leveraging the structure of the controlled-environment facility by limiting the availability of a Wi-Fi signal providing the stream through the placement of wireless access points, antenna directionality of such wireless access points, and/or the like. Also, the IRD may have a few fixed apps pre-installed on the device, such as a communications or video visitation app, such as may be employed in conjunction with the present systems and methods. Installation of further apps on the device may be forbidden (i.e. prevented by modifications to the device's operating system, or the like) and/or restricted, such as by requiring permission from a facility administrator, or the like. Further apps provided on IRD 120 might include apps of particular interest to residents of the controlled-environment facility. For example, IRD 120 (i.e. an IID) provided to inmates of correctional facilities, might include apps that may be of particular use to an inmate, in general, such as access to a legal research service, or of more specific interest, such as providing an inmate nearing release, access to employment searching apps or the like. Hence, such IIDs may be used to help soon to be released inmates transition. For example, the IID may be used to communicate with a future employer, or the like. As such, IIDs may be sponsored, or otherwise subsidized by organizations or companies, assisting with the transition of inmates into society.

In some embodiments, video communication devices (IFDs) 125 may be implemented as a computer-based system. For example, each of video communication devices (IFDs) 125 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video communication session, video communication devices (IFDs) 125 may be configured to capture a video image of a resident to be transmitted to a non-resident using the camera, and to display a video image of the non-resident to the resident using the display. Video communication devices (IFDs) 125 may also be configured to capture an audio signal from the resident to be transmitted to a non-resident using the mouthpiece portion of the handset, and to provide an audio signal from the non-resident to the resident using the earpiece portion of the handset. Additionally, or alternatively, audio received from the non-resident may be reproduced via a loudspeaker, and audio provided by the resident may be captured via a microphone. In some cases, video communication devices (IFDs) 125 may assume the form of any computer, tablet computer, smart phone, etc., or any other consumer device or appliance with videoconferencing capabilities. For example, in a correctional facility environment a tablet computing device may be mounted on a wall, in a hardened case as a video communication device.

To access communications services, a resident may initiate telephone services by lifting the receiver on telephone 115 or IFD 125, and/or otherwise initiating a call, such as by launching an applications program (app) on IRD 120. At which time, the resident may be prompted to provide a personal identification number (PIN), other identifying information or biometrics. An interactive voice response (IVR) unit (not shown, but which may be integrated into controlled-environment facility communications processing system 105) may generate and play a prompt, or other messages, to the resident on device 115, 120 or 125. Under the control of controlled-environment facility communications processing system 105, devices 115, 120 and 125 may be capable of connecting to a non-resident's (i.e., a person not incarcerated or otherwise committed to a controlled-environment facility) device 130 or telephone 135 across a publicly switched telephone network (PSTN) 140. For example, device 130 may be a mobile phone, whereas telephone 135 may be located at a non-resident's home or office, at a resident visitation center, etc. Switch 145 in controlled-environment facility communications processing system 105 may be used to connect calls across PSTN 140. Additionally, or alternatively, the non-resident may communicate using devices 150 or 155, which may be connected through an Integrated Services Digital Network (ISDN), Voice-over-IP (VoIP), or packet data network 160, such as, for example the Internet. Router 165 of controlled-environment facility communications processing system 105 is used to route data packets associated with a call connection to devices 150 or 155. For example, a non-resident party may have a personal or laptop computer 155 with a webcam, or the like, or device 150 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

Video visitation system 170 may be configured to provide, schedule, and manage communication services to residents and non-residents of a controlled-environment facility. Although video visitation system 170 is shown in FIG. 1 as being located with controlled-environment facility 110 and separate from controlled-environment facility communications processing system 105, video visitation system 170 may be located outside facility 110 and/or integrated within controlled-environment facility communications processing system 105. Video visitation system 170 and/or controlled-environment facility communications system 105 receive and/or manage video visitation signals via network 160. Video visitation system 170 may be coupled to PSTN 140 and/or network 160 in a manner similar to controlled-environment facility communications processing system 105 by also including one or more gateways, switches and/or routers (not shown). Accordingly, video visitation system 170 may be configured to communicate with one or more residents of the controlled-environment facility via devices 115, 120 or 125 and with one or more non-residents via devices 130, 135, 150 or 155. To this end, video visitation system 170 may include one or more media gateways, multimedia servers, and/or the like, which may facilitate video communications under direction of a media gateway controller, which may be separate from or integrated with video visitation system 170 and/or its media gateway(s), multimedia server(s), etc.

In addition to providing certain visitation and communication operations, controlled-environment facility communications processing system 105 may attempt to ensure that a resident's calls, video conferences, online chats, etc. are performed only with non-residents whose identities, devices, email addresses, phone numbers, etc. are listed in that resident's Pre-Approved Contact (PAC) list. Each resident's PAC list may be stored, for example, in database 175 maintained by controlled-environment Administration and Management System (AMS) 180. In addition to PAC list(s), AMS 180 may also store Resident Profile Data (RPD), as well as communication and/or visitation rules applicable to each resident. As an example, in the context of a correctional facility, AMS 180 is referred to as a Jail Management System (JMS). Within the AMS or JMS 180, database 175 may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 185, which may be a separate system, or which may be a part or function of AMS 180, as illustrated, may maintain resident accounts to the benefit of the respective resident, such as a resident communications accounts, which may be used to pay for communications, such as phone calls, video visitation, internet chats, emails, text messages, or the like. Such communications accounts may in some embodiments, include community communications accounts maintained by controlled-environment facility resident account management system 185, administration and management system 180, and/or the like, of at least one controlled-environment facility, to the benefit of a number of residents of the same or different facilities for payment of communications.

In some implementations, controlled-environment facility communications processing system 105 may be configured to perform video communication monitoring operations such as monitor and/or record video communication sessions (e.g., as electronic video files). In scenarios where controlled-environment facility communications processing system 105 is located within the controlled-environment facility, it may have direct access to AMS or JMS 180. In other embodiments, however, controlled-environment facility communications processing system 105 may be located remotely with respect to the controlled-environment facility, and access to AMS or JMS 180 may be obtained via a computer network such as, for example, network 160.

In accordance with embodiments of the present systems and methods for management of controlled-environment facility resident image and/or background during video visitation, controlled-environment facility communications processing system 105 may (in conjunction with video visitation system 170 and/or AMS 180) embody or include a controlled-environment facility electronic communications management system, which hosts controlled-environment facility communications access services. Such communications access services may provide, or otherwise facilitate, controlled-environment facility resident access to voice communications (including VoIP communications), video (such as video visitation sessions) or other electronic communications.

FIG. 2 is a diagrammatic illustration of example controlled-environment facility resident communications and/or data device 120, according to some embodiments of the present systems and methods. As noted above, controlled-environment facility resident communications and/or data device 120 (IRD or IID 120) may take the form of a tablet computing device, or the like, adapted, or otherwise approved, for use in a controlled-environment facility. As will be appreciated, controlled-environment facility resident communications and/or data device 120, or other similar devices have video conferencing capabilities, or the like, to enable a party to participate in video communication sessions with other call parties, such as non-residents of the controlled-environment facility, via video communication, secure online chat, etc. To such ends, controlled-environment facility resident communications and/or data device 120 (IRD or IID) includes screen 202 one or more hardware buttons 204, a camera 206 and microphone 208. A resident may make a phone call or initiate or participate in a video visitation on controlled-environment facility resident communications and/or data device 120, using a calling or video app (210) shown open in FIG. 2. Camera 206 may be capable of capturing an image of a user and microphone 208 the user's speech. Lighting of a subject during a video call may be accomplished using visible light from light 212. Alternatively, or additionally, a second light source 214 (such as illustrated around camera 206) may provide lighting.

In accordance with embodiments of the present systems and methods for management of controlled-environment facility resident image and/or background during video visitation, camera 206 of controlled-environment facility resident communications and/or data device 120 is enabled or disabled based on information associated with the resident device, provided by the resident device, such as location information with respect to the controlled-environment facility. Hence, in accordance with some embodiments of the present systems and methods, the Operating System (OS) of a controlled-environment facility resident communications and/or data device may transmit a request to enable its camera, to the controlled-environment facility electronic communications management system (i.e. controlled-environment facility communications processing system 105, video visitation system 170 and/or AMS 180), when an operation for using camera 206 is detected (such as initiation of a video visitation session, via app 210), to capture an image, video etc. In accordance with such embodiments, the controlled-environment facility electronic communications system may communicate with controlled-environment facility resident communications and/or data device 120 to enable or disable camera 206 based on the information associated with resident device 120, wherein the information associated with resident device 120 may include the location of the resident device within the controlled-environment facility. The location information associated with the resident device may be detected by one or more sensors disposed in the resident device and/or sensors and networking components disposed in the controlled-environment facility.

Memory of controlled-environment facility resident communications and/or data device 120, which in accordance with various embodiments is internal to the resident device, is tamper resistant, such that the data stored in the memory is deleted or altered beyond recovery in the event an attempt to tamper with the resident device is detected by the resident device itself or the controlled-environment facility electronic communications management system.

Implementation of various embodiments of the present systems and methods may begin with a request to initiate a video visitation session, or the like made and received from a controlled-environment facility resident communications and/or data device (120) or from a device (150, 155, etc.) operated by a non-resident, such as a friend or family member of the resident.

Generally, exchange of voice data from a controlled-environment facility resident communications and/or data device 120 and from non-resident device 150 or 155 is allowed. Also, video frames from non-resident device 150 or 155 are generally allowed, but in certain circumstances, such as discussed below, video frames from non-resident device 150 or 155 can also be filtered. However, in accordance with various embodiments of the present systems and methods, video frames (e.g. image frames) may not be captured by camera 206 of controlled-environment facility resident communications and/or data device 120 or, as noted, the OS of device 120 may disable camera 206, so as to not capture video frames during video visitation. Alternatively, in such embodiments video frames captured by device 120 are not transmitted to non-resident devices 150, 155, etc. In such embodiments, the aforementioned controlled-environment facility electronic communications management system (i.e. controlled-environment facility communications processing system 105, video visitation system 170 and/or AMS 180) may block the video frames captured by device 120 during the video visitation, based on the information associated with controlled-environment facility resident communications and/or data device 120.

In some embodiments, the information associated with controlled-environment facility resident communications and/or data device 120 may enable the controlled-environment facility electronic communications management system (i.e. controlled-environment facility communications processing system 105, video visitation system 170 and/or AMS 180) to differentiate the resident device in use by a resident from another video visitation device, such as IFD 125, another device in use by another resident or the like, which may also be used for video visitation.

The information associated with controlled-environment facility resident communications and/or data device 120 may be fixed or can be changed based on the location of controlled-environment facility resident communications and/or data device 120, time of a requested video visitation session, or the like. The information associated with controlled-environment facility resident communications and/or data device 120 may be determined by the one or more sensors, such as proximity sensors, GPS sensors, gyro sensors, accelerometers, or the like, disposed in the resident device and/or by networking components, such as Access Points (AP), Near Field Communication devices (NFC), Radio Identification devices (RFID) to which the resident device is currently connected and various sensors employed inside controlled-environment facility 110. The information associated with controlled-environment facility resident communications and/or data device 120 may be geographical location of the device, an IP address associated with the device, a MAC ID of the device, an Address Identifier (AID) of the device, and/or the like. The information associated with the resident device may be used by the electronic communications management system (i.e. controlled-environment facility communications processing system 105, video visitation system 170 and/or AMS 180) to identify whether the resident device poses any security threats during a video visitation. In particular, the information associated with the resident device may enable the controlled-environment facility electronic communications management system to determine whether the video frames captured by the resident device pose a security threat to the controlled-environment facility.

The information associated with controlled-environment facility resident communications and/or data device 120 may not only be transmitted at initiation of a video visitation, but may also transmitted to the electronic communications management system (i.e. controlled-environment facility communications processing system 105, video visitation system 170 and/or AMS 180 once in every predetermined period of time during the video visitation session. Additionally or alternatively, information associated with device 120 may be transmitted to the electronic communications management system (i.e. to controlled-environment facility communications processing system 105, video visitation system 170 and/or AMS 180) along with all the video frames captured by controlled-environment facility resident communications and/or data device 120 or just along with one or more frames captured during the video visitation, such as at various frame-count intervals.

In some embodiments, and/or in some circumstances, controlled-environment facility resident communications and/or data device 120 is configured to transmit the information associated with controlled-environment facility resident communications and/or data device 120 based on a request from electronic communications management system (i.e. from controlled-environment facility communications processing system 105, video visitation system 170 and/or AMS 180).

A database, such as a part of database 175 of AMS 180, or a database otherwise associated with the controlled-environment facility electronic communications management system (i.e. controlled-environment facility communications processing system 105, video visitation system 170 and/or AMS 180) may store a plurality of particular controlled-environment facility resident communications and/or data device ID, such as IP addresses associated with devices, MAC IDs of devices, AIDs of devices, and/or the like, of devices that may pose security threats to the controlled-environment facility. If a device ID of controlled-environment facility resident communications and/or data device 120 is determined, before and/or during a video visitation session, to belong to one among the plurality of device IDs that is associated with these security threats, the video frames captured by this device may be blocked in accordance with embodiments of the present systems and methods. Moreover, the information associated with controlled-environment facility resident communications and/or data device 120 may additionally or alternatively be stored in database 175 of AMS 180, or otherwise in association with the controlled-environment facility electronic communications management system as device IDs.

The controlled-environment facility electronic communications management system can reject a request to initiate a video visitation session, and/or terminate the video visitation session based on the information associated with controlled-environment facility resident communications and/or data device 120, received prior to, or during the video visitation, respectively. Also, in accordance with embodiments of the present systems and methods, the controlled-environment facility electronic communications management system may be configured to determine whether to allow or block the video frames from such a device before and/or during the video visitation session based on the stored device IDs alone, or in conjunction with the received information associated with the resident.

FIG. 3 is a diagrammatic block illustration of example location-based one-way video visitation process 300 for management of controlled-environment facility resident image and/or background during video visitation, according to some embodiments. As used herein, one-way video visitation refers to display of video in only one direction during a controlled-environment facility video visitation, such as display of video (and audio) of the non-resident to the resident, while only audio from the resident is provided to the non-resident. In the location-based one-way video visitation for video visitation illustrated in the FIG. 3, controlled-environment facility electronic communications management system 305, may comprise any one or more of controlled-environment facility communications processing system 105, video visitation system 170 and/or AMS 180, or the like. In accordance with embodiments of the present systems and methods, controlled-environment facility electronic communications management system 305 determines the location of controlled-environment facility resident communications and/or data devices 310 and 315, for example, based on received information associated with these devices.

The location information for devices 310 and 315 may be based on a device-generated Global Positioning System (GPS) location, a network address of access point 320 or 325, located in particular areas 330 and 335, respectively, of a controlled-environment facility, to which devices 310 and 315 are respectively communicatively connected (through). In accordance with embodiments of the present systems and methods video frames 340 and 345 from controlled-environment facility resident communications and/or data device 310 and/or 315 may be dropped or blocked, if the location of the respective device is restricted for two-sided video visitation.

In some embodiments, if the location is restricted for video visitation, electronic communications management system 305 may be configured to disconnect the video visitation session. For example, if the resident device is already in a video visitation session, the video visitation session may be disconnected if the resident device moves into a restricted location and disable starting of a video visitation session inside the restricted location. However, in some embodiments electronic communications management system 305 may notify the user (resident), via the controlled-environment facility resident communications and/or data device that the resident device is in a restricted location for video visitation before the establishment of a video visitation session, or during the video visitation session.

Controlled-environment facility electronic communications management system 305 may also have the capability to detect certain image features associated with captured video frames 340 and 345. The image features being associated with a security threat and/or facility rules violation (e.g. nudity, hand signals, written material, background environment, weapons, etc.). Controlled-environment facility electronic communications management system 305 may block video frames based on the detected image features. In various embodiments, image features to be detected may be image features of a human face and/or background features. For example, control-environment facility electronic communications management system 305 may block or drop the video frames 340 and/or 345 if a human face is not detected in the video frames received at electronic communications management system 305, if the number of human faces in the video frame(s) received is more than a predetermined number, if the number of pixels in the video frame(s) covered by the human face is less than a predetermined number of pixels, if a predetermined gesture or motion is detected in one or more of the video frames, if a restricted environment or location is recognized in the background of the images, and/or the like. The predetermined gestures include obscene gestures and hand gestures, which are restricted or may cause a security threat, per rules of controlled-environment facility.

To the above ends, embodiments of the present systems and methods may make use of "face detection" processes, and/or further or various other embodiments may make use of "facial recognition" processes. Face detection is a computer technology that identifies human faces in digital images. Face detection can be regarded as a specific case of object-class detection. In object-class detection, the task is to find the locations and sizes of all objects in an image that belong to a given class. Face detection algorithms focus on the detection of frontal human faces. Face detection is used in biometrics, often as a part of, or together with, a facial recognition system. Hence, face detection may be used to detect human faces, which might then be used for recognizing a particular face in a facial recognition process. However, such face detection may be used alone, without the use of facial recognition, in fields such as video surveillance, human computer interface, image database management, and/or in accordance with various embodiments of the present systems and methods. Face detection may be a fast, less computational-intensive process, which may be performed by a small local computer system, without the need to necessarily access databases, more powerful computational resources, or the like, which may be necessary for facial recognition.

However, in some embodiments, electronic communications management system 305 may be capable to recognize facial features of a human face and can determine whether the recognized facial features are associated with the user of respective controlled-environment facility resident communications and/or data device 310 or 315, using facial recognition, or the like. This prevents misuse of controlled-environment facility resident communications and/or data devices 310 of 315 by others. In such embodiments, electronic communications management system 305 may be configured to block video frames 340 or 345 in the event a mismatch is detected between the facial features in one or more of such frames and stored facial features of a user (resident) associated with the respective device 310 or 315.

In some embodiments, electronic communications management system 305 may blur or blacken the video frames received from the controlled-environment facility resident communications and/or data device instead of blocking the video frames.

In accordance with various embodiments of the present systems and methods for management of controlled-environment facility resident image and/or background during video visitation, electronic communications management system 305 may transmit an icon instead of the blocked or dropped video frames to the non-resident during the video visitation. The icon may be any image selected by the resident, non-resident, or an authority associated with the controlled-environment facility. In such embodiments, an icon selected by the resident may be required to be approved by the controlled-environment facility authority (e.g. by a person or digitally). The icon may be a recorded video clip (without sound), an image of the resident, other graphic image (e.g. a cartoon image, graphic design, etc.), or the like, approved by the authority and stored in database 350, or the like (which may be database 175 associated with AMS 180, or the like).

Controlled-environment facility electronic communications management system 305 may store blocked video frames, such as illustrated video frames 340 from device 310 transmitted from location 330, in the illustrated embodiment, in storage 355 (which may be a part of database 175 of AMS 180, or the like). Additionally, Controlled-environment facility electronic communications management system 305 may also store allowed video frames, such as illustrated video frames 345 from device 315 transmitted from location 335, in the illustrated embodiment, as well as passing allowed video frames 345 on to network 360 for transmission to the non-resident (such as transmission, via network 160 of FIG. 1, to non-resident device 150 or 155).

FIG. 4 is a flowchart of example process 400 for one-way video visitation for management of controlled-environment facility resident image and/or background during video visitation, according to some embodiments. Therein, video frames are not captured by the controlled-environment facility resident communications and/or data device (120) or captured video frames are not streamed to the controlled-environment facility electronic communications management system (305), or the like. Similarly, FIG. 5 is a flowchart of another example process, process 500 for one-way video visitation for management of controlled-environment facility resident image and/or background during video visitation, according to some embodiments. However, therein, the video frames are captured from the inmate personal tablet device and are streamed to the electronic communications management system, or the like. The video frames received at the electronic communications management system may or may not be forwarded to the non-resident video visitation participant, as discussed above and below.

At 402 and 502 a real-time video visitation may be initiated by a controlled-environment facility resident, via a visitation app (210) on a controlled-environment facility resident communications and/or data device (120) and may entail the resident providing identity verification data via the resident device. Alternatively, at 402 and/or 502 a non-resident may initiate a video visitation session on a non-resident device (150 or 155), such as via a visitation app or website. The non-resident may also be required to provide identity verification data via the non-resident device.

At 404 and 504 any number of video-visitation rules associated with the controlled-environment facility may be applied. However, in accordance with the present systems and methods for management of controlled-environment facility resident image and/or background during video visitation such rules may include determining whether a controlled-environment facility resident communications and/or data device (120) to be used in the video visitation is approved to have two-way video visitations, based on the information associated with the resident device. Other rules that may apply may include security rules associated with the controlled-environment facility, such as, determining whether the information associated with the resident device, belongs to one among the plurality of device IDs that may pose a security threat. Further rules to be met at 404 and/or 504 may apply to verifying the identity of the resident and/or non-resident, via identification information such as a Personal Identification Number (PIN), biometric data, or the like, associated with the user. A determination may be made at 404 and/or 504 that any payment necessary for the video visitation has been provided, is available for collection, or the like.

If rules for the video visitation to begin are met at 404 or 504, a video call (visitation) request is initiated at 406 or 506, respectively. Then at 408 or 508, the controlled-environment facility resident communications and/or data device (120) operated by the resident and the non-resident device (150 or 155) operated by the non-resident exchange and negotiate video visitation session parameters. At 410 or 510, the controlled-environment facility electronic communications management system (305) (which, as described above may comprise any one or more of controlled-environment facility communications processing system 105, video visitation system 170 and/or AMS 180, or the like) determines whether the negotiation for video visitation was successful or not.

Thereafter, in response to a determination at 410 that the video call negotiation was successful process 400 of FIG. 4 continues by the controlled-environment facility resident communications and/or data device (120) capturing and/or streaming only voice data captured by a microphone (208) of the resident device at 412 and 414. Only voice data may be captured (i.e. the camera (206) of the resident device may be turn-off or disabled (or not present)), or captured video frames may just not be streamed or blocked by the resident device at 414, in accordance with facility rules or as a result of a determination made by the controlled-environment facility electronic communications management system (305), or the like, for example at 404 that facility rules only allow voice data from the resident's side of the visitation, due to the location of the resident device, or due to other considerations. For example, the time of day of a video visitation and/or duration of a video visitation may be considered, in light of facility rules. For example, if the time of day a video visitation is attempted is during a restricted time period set by facility (e.g. between 10:00 pm and 6:00 am), then two-way video visitation may not be allowed. In another example if time duration of a video visitation exceeds a predetermined time interval (e.g. ten minutes), then the video frames captured by the resident device after the predetermined time interval (i.e. after ten minutes) may be dropped or intercepted.

Conversely, in process 500 of FIG. 5, in response to a determination at 510 that the video call negotiation was successful, the controlled-environment facility resident communications and/or data device (120) captures at 512, and streams at 514, both voice data and the video frames. The controlled-environment facility electronic communications management system (305) may still block this media, particularly the video frames as discussed below with respect to set 520 based on information associated with the resident device or image features detected in the video frames.

Both voice and video data is captured at the non-resident device using a camera and microphone of the non-resident device (150 or 155) at 416 or 516 and is streamed to the controlled-environment facility electronic communications management system at 418 or 518.

At 420 or 520, the controlled-environment facility electronic communications management system (controlled-environment facility communications processing system 105, video visitation system 170 and/or AMS 180, or the like) can record and/or filter the media from the controlled-environment facility resident communications and/or data device (120) and/or the non-resident device (150 or 155). The controlled-environment facility electronic communications management system may block the media based on the information associated with the resident device, based on image features detected in the video data and/or audio data from the resident or non-resident user, etc.

At 422 or 522, the controlled-environment facility electronic communications management system, or the like determines whether the video visitation completed successfully. If the video visitation ends successfully, the controlled-environment facility electronic communications management system reports the success to the resident, the non-resident, the facility (authorities), a database (175) associated with the controlled-environment facility and/or the like at 424 or 524. However, at 426 or 526, the controlled-environment facility electronic communications management system reports failure of the video visitation session to the resident, the non-resident, the facility (authority), the database (175, 350) and/or the like, if the rules to initiate the video visitation were not met at 404 or 504, the negotiation at 408 or 508 were deem unsuccessful at 410 or 510, or if the video visitation was otherwise determined as ending unsuccessfully at 422 or 522.

In accordance with some embodiments of the present systems and methods analysis (at, for example, 404 or 504) of whether a resident and/or resident device is allowed two-way video visitation or is restricted to one-way video visitation, and/or filtering media may be carried out by the controlled-environment facility resident media and/or communications device (120, 125) (and/or the non-resident device (150, 155)). For example, in some such embodiments, the controlled-environment facility communications management system (305) (e.g. controlled-environment facility communications processing system 105, video visitation system 170, AMS 180, and/or the like) may be configured to cause the resident device (and/or non-resident device) to analyze and filter or block media. As above, this analysis may be based on various parameters like location, video frame content etc., such as discussed above. In this manner, in some embodiments, a resident device may be configured to determine whether to send or block the video frames based on various parameters, such as described herein (e.g. based on analysis of video frame contents, location, time of operation etc.), i.e., the resident device can determine, in accordance with such embodiments whether to be restrict itself to one-way video visitation or to allow two-way video visitation. However, in some of these embodiments, controlled-environment facility electronic communications management system (305) may cause the resident device (or non-resident device) to only carry out the analysis (and resultant blocking or filtering) for a predetermined duration, or only during certain hours of operation.

Embodiments of the present systems and methods for management of controlled-environment facility resident image and/or background during video visitation, as described herein, may be implemented or executed, at least in part, by one or more computer systems. One such computer system is illustrated in FIG. 6. In various embodiments, computer system 600 may be a server, a mainframe computer system, a workstation, a network computer, a desktop computer, a laptop, a tablet computing device, media player, or the like. For example, in some cases, computer 600 may implement one or more steps of example processes 300, 400 and/or 500 described above with respect to FIGS. 3 through 5, and/or a computer system such as computer system 600 may be used as, or as part of, one or more of controlled-environment facility communications processing system 105, resident devices 120, 310 or 315, IFD 125, non-resident devices 150 or 155, video visitation system 170, AMS 180, controlled-environment facility electronic communications management system 305, and/or the like. In various embodiments two or more of these computer systems may be configured to communicate with each other in any suitable way, such as, for example, via a wired or wireless network.

As illustrated, example computer system 600 includes one or more processors 610 coupled to a system memory 620 via an input/output (I/O) interface 630. Example computer system 600 further includes a network interface 640 coupled to I/O interface 630, and one or more input/output devices 650, such as video device(s) 660 (e.g., a camera), audio device(s) 670 (e.g., a microphone and/or a speaker), and display(s) 680. Computer system 600 may also include a cursor control device (e.g., a mouse or touchpad), a keyboard, etc. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In various embodiments, computer system 600 may be a single-processor system including one processor 610, or a multi-processor system including two or more processors 610 (e.g., two, four, eight, or another suitable number). Processors 610 may be any processor capable of executing program instructions. For example, in various embodiments, processors 610 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 610 may commonly, but not necessarily, implement the same ISA. Also, in some embodiments, at least one processor 610 may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 5, above, may be stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-readable medium may include any tangible or non-transitory storage media or memory media such as magnetic or optical media—e.g., disk or CD/DVD-ROM coupled to computer system 600 via I/O interface 630, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 640.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any suitable protocol, timing or other data transformations to convert data signals from one component (e.g., system memory 620) into a format usable by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments, some or all of the functionality of I/O interface 630, such as an interface to system memory 620, may be incorporated into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 6, memory 620 may include program instructions 625, configured to implement certain embodiments described herein, and data storage 635, comprising various data accessible by program instructions 625. In an embodiment, program instructions 625 may include software elements corresponding to one or more of the various embodiments illustrated in the above figures. For example, program instructions 625 may be implemented in various embodiments using any desired programming language, scripting language, or combination of programming languages and/or scripting languages (e.g., C, C++, C#, JAVA®, JAVASCRIPT®, PERL®, etc.). Data storage 635 may include data that may be used in these embodiments. In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for management of controlled-environment facility resident image and/or background during video visitation comprising:

initiating, by a controlled-environment facility resident communications and/or data device, a visitation request;

determining, by a controlled-environment facility electronics communications management system, whether a controlled-environment facility resident user of the controlled-environment facility resident communications and/or data device is, in accordance with rules associated with the controlled-environment facility, approved for two-way video visitation, or restricted to one-way video visitation;

capturing and streaming, by the controlled-environment facility resident communications and/or data device, voice data captured by the controlled-environment facility resident communications and/or data device, to the controlled-environment facility electronic communications management system, in response to determining, by the controlled-environment facility electronics communications management system, that the controlled-environment facility resident is restricted to one-way video visitation;

capturing and streaming, by the controlled-environment facility resident communications and/or data device, voice and video data captured by the controlled-environment facility resident communications and/or data device, to the controlled-environment facility electronic communications management system, in response to determining, by the controlled-environment facility electronics communications management system, that the controlled-environment facility resident is approved for two-way video visitation; and streaming, by a non-resident communications and/or data device, voice and video data captured at the non-resident communications and/or data device to the controlled-environment facility electronic communications management system.

2. The method of claim 1, further comprising recording and filtering, by the controlled-environment facility electronic communications management system, voice and/or video data streamed by the controlled-environment facility resident communications and/or data device and the voice and/or video data streamed from the non-resident communications and/or data device.

3. The method of claim 1, further comprising blocking, by the controlled-environment facility electronic communications management system, voice and/or video data streamed by the controlled-environment facility resident communications and/or data device, based on information associated with the controlled-environment facility resident communications and/or data device.

4. The method of claim 1, further comprising blocking, by the controlled-environment facility electronic communications management system, voice and/or video data streamed from the respective communications and/or data device, based on image features detected in the video data streamed from the controlled-environment facility resident communications and/or data device and/or the non-resident communications and/or data device.

5. The method of claim 1, wherein determining whether the controlled-environment facility resident is approved for two-way video visitation or restricted to one-way video visitation, is based, at least in part on location of the controlled-environment facility resident communications and/or data device.

6. The method of claim 1, further comprising blocking, by the controlled-environment facility electronic communications management system, the voice and/or video data streamed from a respective communications and/or data device, based, at least in part, on a time of day of the visitation.

7. The method of claim 1, further comprising blocking, by the controlled-environment facility electronic communications management system, the voice and/or video data streamed from a respective communications and/or data device, based, at least in part, on a duration of the visitation.

8. The method of claim 1, further comprising reporting, by the controlled-environment facility electronic communications management system, in response to the visitation completing successfully, a successful visitation session to at least one of:
   the controlled-environment facility resident communications and/or data device;
   the non-resident communications and/or data device;
   the controlled-environment facility; and
   a database associated with the controlled-environment facility.

9. The method of claim 1, further comprising reporting, in response to a failure to confirm identity of the user of the controlled-environment facility resident communications and/or data device, failure of the video visitation session to at least one of:
   the controlled-environment facility resident communications and/or data device;
   the non-resident communications and/or data device;
   the controlled-environment facility; and
   a database associated with the controlled-environment facility.

10. A method for management of controlled-environment facility resident image and/or background during video visitation comprising:
   initiating, by a controlled-environment facility resident communications and/or data device, a visitation request;
   capturing and streaming, by the controlled-environment facility resident communications and/or data device, voice and video data to a controlled-environment facility electronic communications management system;
   receiving, by the controlled-environment facility electronic communications management system, the voice and video data captured and streamed by the controlled-environment facility resident communications and/or data device;
   receiving, by the controlled-environment facility electronic communications management system, voice and video data captured and streamed by a non-resident communications and/or data device;
   determining, by the controlled-environment facility electronic communications management system, in accordance with rules associated with the controlled-environment facility, whether a controlled-environment facility resident user of the controlled-environment facility resident communications and/or data device is approved for two-way video visitation or restricted to one-way video visitation;
   transmitting, by the controlled-environment facility electronic communications management system, the voice and video data captured at the non-resident communications and/or data device, to the controlled-environment facility resident communications and/or data device;
   transmitting, by the controlled-environment facility electronic communications management system, to the non-resident communications and/or data device the voice data captured at the controlled-environment facility resident communications and/or data device; and
   transmitting, by the controlled-environment facility electronic communications management system, to the non-resident communications and/or data device the video data captured at the controlled-environment facility resident communications and/or data device, in response to a determination the controlled-environment facility resident is approved for two-way video visitation.

11. The method of claim 10, further comprising the controlled-environment facility resident communications and/or data device streaming the captured voice data, and blocking the video data, to the controlled-environment facility electronic communications management system, in response to a determination the controlled-environment facility resident is restricted to one-way video visitation.

12. The method of claim 10, further comprising recording and filtering the voice data streamed by the controlled-environment facility resident communications and/or data device and the voice and video data streamed from the non-resident communications and/or data device.

13. The method of claim 10, further comprising blocking the streamed voice data, based on information associated with the controlled-environment facility resident communications and/or data device.

14. The method of claim 10, further comprising blocking the voice and/or video data streamed from a respective communications and/or data device, based on image features detected in the video data streamed from the respective controlled-environment facility resident communications and/or data device and/or the non-resident communications and/or data device.

15. The method of claim 10, further comprising using a location of the controlled-environment facility resident communications and/or data device to determine whether the controlled-environment facility resident is approved for two-way video visitation or restricted to one-way video visitation.

16. The method of claim 10, further comprising blocking the voice and/or video data streamed from a respective communications and/or data device, based, at least in part, on a time of day of the visitation.

17. The method of claim 10, further comprising blocking the voice and/or video data streamed from a respective communications and/or data device, based, at least in part, on a duration of the visitation.

18. The method of claim 10, further comprising reporting, in response to the video visitation completing successfully, a successful video visitation session to at least one of:
   a respective controlled-environment facility resident communications and/or data device;
   the non-resident communications and/or data device;
   the controlled-environment facility; and
   a database associated with the controlled-environment facility.

19. The method of claim 10, further comprising reporting, in response to failure to confirm identity of a user of the controlled-environment facility resident communications and/or data device, failure of the video visitation session to at least one of:
   a respective controlled-environment facility resident communications and/or data device;
   the non-resident communications and/or data device;
   the controlled-environment facility; and
   a database associated with the controlled-environment facility.

20. A non-transitory computer-readable storage medium having program instructions stored thereon that, upon execution by a controlled-environment facility resident communications and/or data device, cause the controlled-environment facility resident communications and/or data device to:
   initiate a visitation request;
   capture and stream voice data captured by the controlled-environment facility resident communications and/or data device to a controlled-environment facility electronic communications management system; and
   capture and stream video data captured by the controlled-environment facility resident communications and/or data device, to the controlled-environment facility electronic communications management system, in response to a determination, in accordance with rules associated with the controlled-environment facility, that a controlled-environment facility resident user of the controlled-environment facility resident communications and/or data device is approved for two-way video visitation.

* * * * *